US010717182B2

(12) United States Patent
Chen et al.

(10) Patent No.: US 10,717,182 B2
(45) Date of Patent: Jul. 21, 2020

(54) ANGLE GRINDER

(71) Applicant: Nanjing Chervon Industry Co., Ltd., Nanjing (CN)

(72) Inventors: Liang Chen, Nanjing (CN); Wei Wei, Nanjing (CN); Hongwei Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 298 days.

(21) Appl. No.: 15/676,346

(22) Filed: Aug. 14, 2017

(65) Prior Publication Data

US 2018/0056497 A1 Mar. 1, 2018

(30) Foreign Application Priority Data

Aug. 29, 2016 (CN) .......................... 2016 1 0747943
Aug. 29, 2016 (CN) .......................... 2016 1 0782108

(51) Int. Cl.
*B24B 23/02* (2006.01)
*B23Q 11/12* (2006.01)
*B25F 5/00* (2006.01)

(52) U.S. Cl.
CPC .............. *B25F 5/008* (2013.01); *B23Q 11/12* (2013.01); *B23Q 11/127* (2013.01); *B24B 23/02* (2013.01); *B24B 23/028* (2013.01)

(58) Field of Classification Search
CPC ....... B24B 23/00; B24B 23/02; B24B 23/028; B25F 5/008; B23Q 11/10; B23Q 11/12; B23Q 11/127

USPC .......................................................... 451/359
See application file for complete search history.

(56) References Cited

U.S. PATENT DOCUMENTS

| 8,816,544 | B2 * | 8/2014 | Tanimoto | B24B 23/028 |
| | | | | 310/50 |
| 9,314,900 | B2 * | 4/2016 | Vanko | B25F 5/008 |
| 9,662,760 | B2 * | 5/2017 | Schuele | B24B 23/028 |
| 10,173,311 | B2 * | 1/2019 | Takeda | B25F 5/00 |
| 2011/0168422 | A1 * | 7/2011 | Fujiwara | B25F 5/008 |
| | | | | 173/217 |
| 2011/0171887 | A1 * | 7/2011 | Tanimoto | B24B 23/028 |
| | | | | 451/359 |
| 2014/0242890 | A1 * | 8/2014 | Boeck | B24B 47/12 |
| | | | | 451/358 |
| 2015/0111480 | A1 * | 4/2015 | Vanko | B25F 5/008 |
| | | | | 451/359 |

(Continued)

*Primary Examiner* — Eileen P Morgan
(74) *Attorney, Agent, or Firm* — Greenberg Traurig, LLP

(57) ABSTRACT

An angle grinder includes a housing formed with a handle, a clamping device for mounting a grinding disk, an output shaft for driving the clamping device to rotate, a brushless motor being provided with a motor shaft, a transmission mechanism for transmitting power between the motor shaft and the output shaft, and a circuit board assembly for providing electricity to the brushless motor. The clamping device is disposed outside of the housing and connected with the output shaft. The output shaft is at least partially disposed inside of the housing and connected with the transmission mechanism. The brushless motor is arranged between the transmission mechanism and the circuit board assembly in a direction substantially parallel to the motor shaft, and the motor shaft is disposed along a direction substantially perpendicular to the output shaft.

13 Claims, 14 Drawing Sheets

(56) References Cited

U.S. PATENT DOCUMENTS

| | | | | |
|---|---|---|---|---|
| 2015/0263592 A1* | 9/2015 | Kawakami | ............... | H02K 9/06 |
| | | | | 310/50 |
| 2015/0328742 A1* | 11/2015 | Schuele | ................ | B24B 23/028 |
| | | | | 451/359 |
| 2016/0020676 A1* | 1/2016 | Omura | .................. | B24B 23/028 |
| | | | | 310/50 |
| 2016/0121475 A1* | 5/2016 | Valentini | ................. | B24B 23/04 |
| | | | | 451/344 |
| 2016/0193727 A1* | 7/2016 | Takeda | .................. | B24B 23/028 |
| | | | | 173/46 |
| 2016/0375570 A1* | 12/2016 | Boeck | .................. | B24B 23/028 |
| | | | | 700/169 |
| 2017/0136614 A1* | 5/2017 | Takeda | ....................... | B25F 5/00 |
| 2017/0165824 A1* | 6/2017 | Takeda | ....................... | B25F 5/00 |
| 2017/0234484 A1* | 8/2017 | Vanko | ....................... | F16P 7/02 |
| | | | | 173/176 |
| 2018/0099372 A1* | 4/2018 | Takeda | .................... | B24B 23/02 |
| 2018/0111259 A1* | 4/2018 | Takeda | ....................... | B25F 5/00 |
| 2019/0039228 A1* | 2/2019 | Matsushita | ............... | B25F 5/00 |
| 2019/0047115 A1* | 2/2019 | Nakamura | .............. | B24B 23/02 |

* cited by examiner

US 10,717,182 B2

ANGLE GRINDER

RELATED APPLICATION INFORMATION

This application claims the benefit under 35 U.S.C. § 119(a) of Chinese Patent Application No. CN201610782108X, filed on Aug. 29, 2016 and Chinese Patent Application No. CN 201610747943X, filed on Aug. 29, 2016, each of which is incorporated herein by reference in its entirety.

FIELD OF THE DISCLOSURE

The present disclosure relates generally to power tools and, more particularly, to an angle grinder.

BACKGROUND OF THE DISCLOSURE

An angle grinder, also called a grinding machine or a disc grinding tool, is a hand-held power tool which is mainly used to cut, grind, and brush grind metal, stone, etc.

However, the currently known angle grinder has a complex structure and, as such, the assembly time thereof is too long. Further, the angle grinder does not facilitate detachment and repair by a user.

Otherwise, the angle grinder is provided with a circuit board therein for controlling the motor. The circuit board is provided with a circuit element which generates a lot of heat in the housing after working for a long time. If the heat cannot be dissipated in time, the use time of the circuit element and the whole angle grinder may be effected.

The statements in this section merely provide background information related to the present disclosure and may not constitute prior art.

SUMMARY

In one aspect of the disclosure, an angle grinder is provided. The angle grinder includes a housing being formed with a handle, a clamping device for mounting a grinding disk, an output shaft for driving the clamping device to rotate, a brushless motor being provided with a motor shaft, a transmission mechanism for transmitting power between the motor shaft and the output shaft, and a circuit board assembly for providing electricity to the brushless motor. The clamping device is disposed outside of the housing and is connected with the output shaft. The output shaft is at least partially disposed inside of the housing and connected with the transmission mechanism. The brushless motor is arranged between the transmission mechanism and the circuit board assembly in a direction substantially parallel to the motor shaft, and the motor shaft is disposed along a direction substantially perpendicular to the output shaft.

Further areas of applicability will become apparent from the description provided herein. It should be understood that the description and specific examples are intended for purposes of illustration only and are not intended to limit the scope of the present disclosure.

Figure 1:
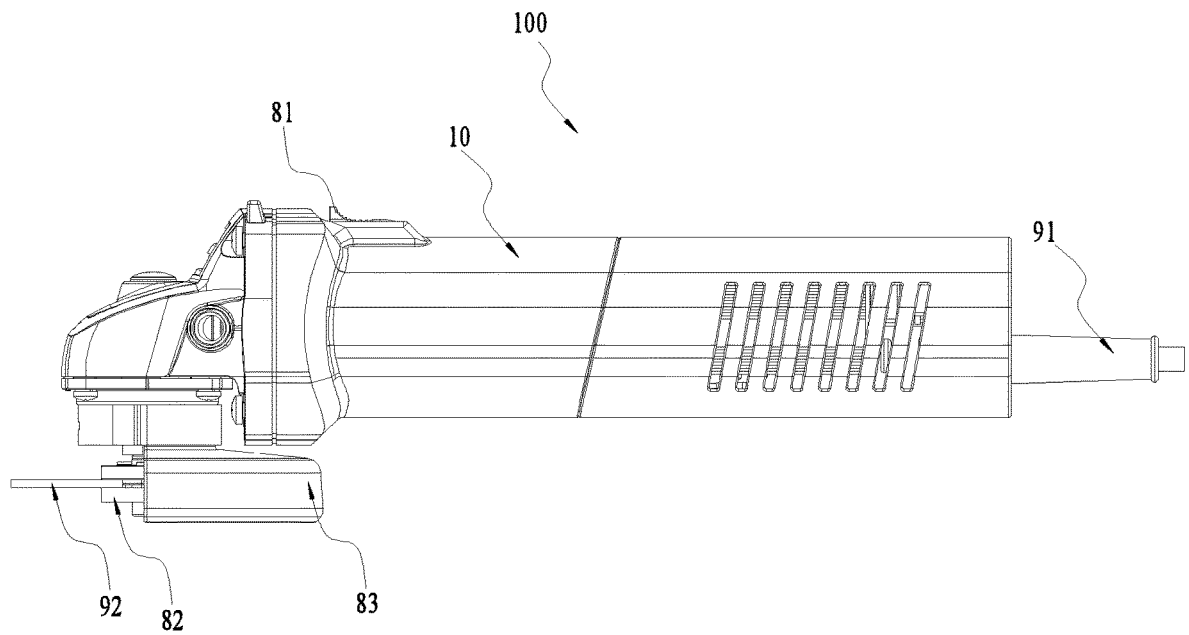
FIG. 1 is a schematic view of an example of an angle grinder.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit scope of the invention hereinafter claimed, its application, or uses.

Figure 2:
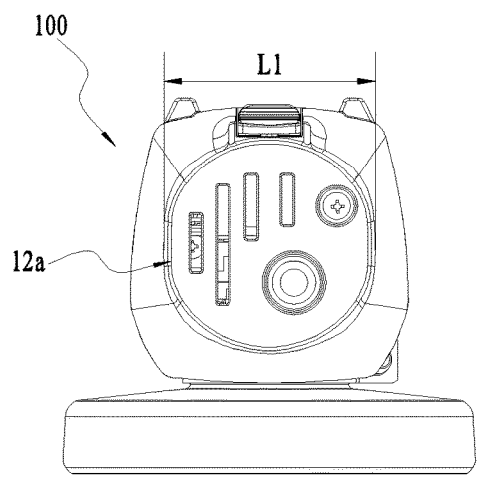
FIG. 2 a back view of the angle grinder in FIG. 1.
Figure 3:
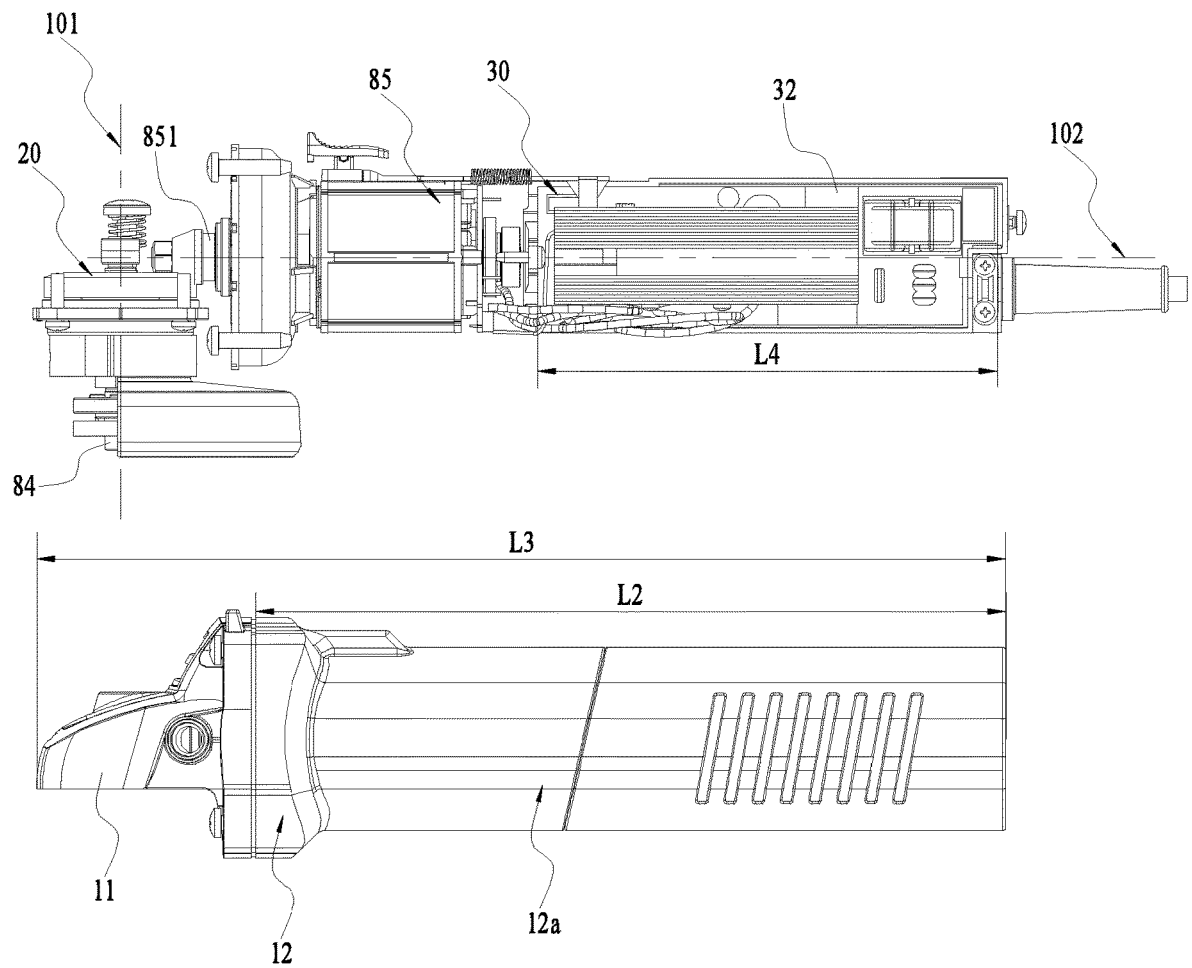
FIG. 3 is a plane view of the angle grinder in FIG. 1, wherein a housing and other parts are separated.

Referring to FIGS. 1-2, an angle grinder 100 includes a housing 10, a switch 81, a power supply 91, a clamping device 82 and a guard 83. As shown in FIG. 3, the angle grinder 100 further includes an output shaft 84, a brushless motor 85, a transmission mechanism 20 and a circuit board assembly 30.

Figure 4:
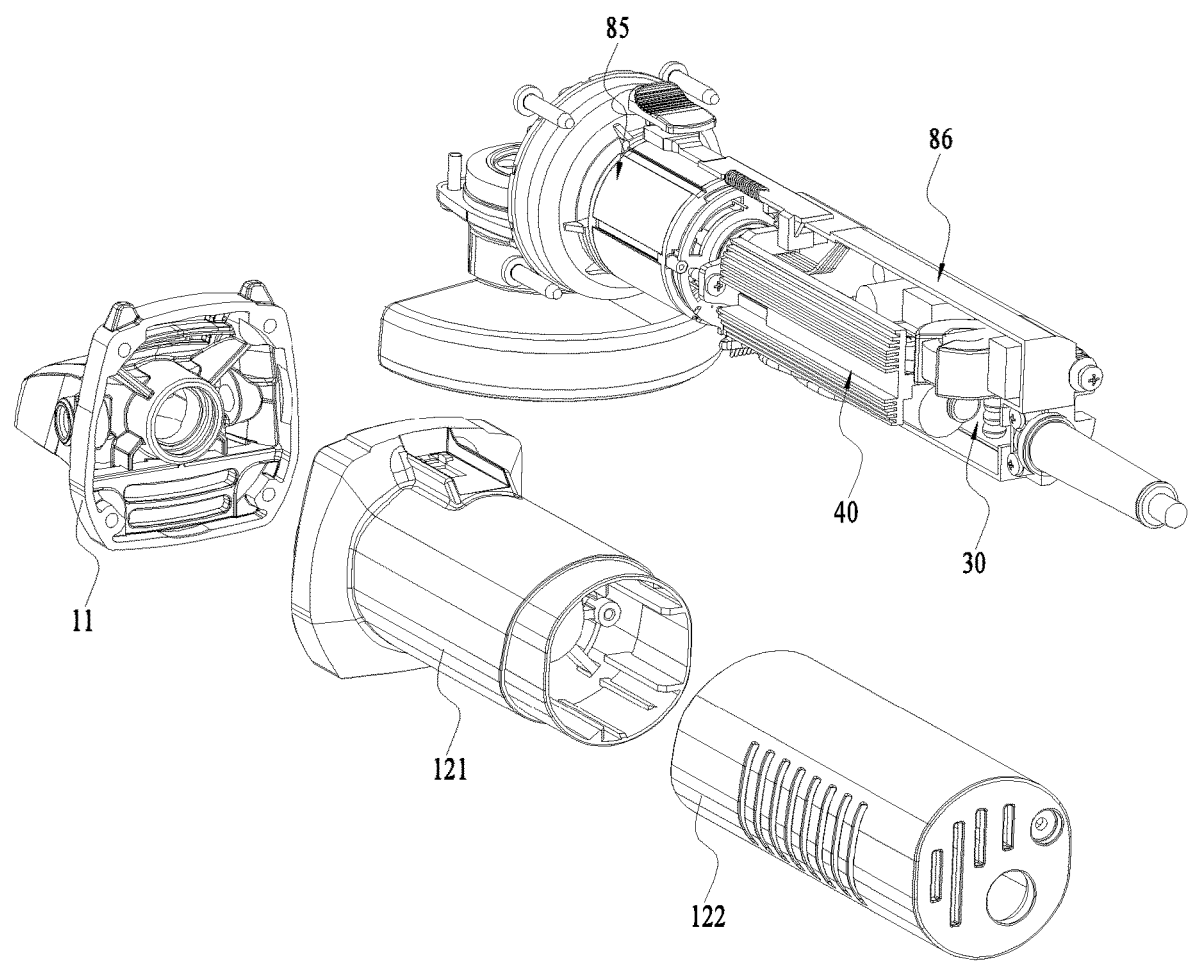
FIG. 4 is a schematic view of the structure in FIG. 3.

The housing 10 forms a handle portion 12a. The handle portion 12a is provided with a containing space for containing the brushless motor 85, the transmission mechanism 20, and the circuit board assembly 30. Referring to FIGS. 2-4, the housing 10 mainly includes a front housing 11 and a handle housing 12. The handle housing 12 forms the handle portion 12a for a user to grip.

The front housing 11 for mounting the output shaft 84 is connected with an end of the handle housing 12. The front housing 11, as a part of the housing 10, is opened outwards, so that the output shaft 84 and the clamping device 82 are at least partially exposed out of the housing 10.

The handle housing 12 includes a motor housing 121 and a rear housing 122. When the motor housing 121 and the rear housing 122 are connected together as a whole, they constitute the handle housing 12. The handle portion 12a can be considered as a part of the handle housing 12 which is adapted to be gripped by the user. For example, in the present example, the end of the handle housing 12 with which the front housing 11 is connected is thicker than the other part of the handle housing 12. The thicker part of the handle housing 12 is not adapted to be gripped by the user, and the thinner part of the handle housing 12 is adapted to be gripped by the user. The part of the handle housing 12 which is adapted to be gripped can be considered as the handle portion 12a. Correspondingly, the handle portion 12a has a length which is shorter than the length of the handle housing 12. However, it is not limited to this. For example, when the entire handle housing 12 has a relatively uniform thickness, the entirety of the handle housing 12 is adapted to be gripped by the user. At this moment, the entire handle housing 12 can be considered as the handle portion 12a, and the length of the handle portion 12a is the same as the length of the handle housing 12.

The switch 81 can be mounted on the handle housing 12. So, when the user grips the handle portion 12a, the switch 81 can be actuated conveniently. The switch 81 can be a trigger for actuating the angle grinder 100.

The power supply 91 is used to provide electricity to the angle grinder 100, which can be an external power supply. However, it can be comprehended that the power supply 91 can be a DC power supply.

The output shaft 84 is used to drive the clamping device 82 connected therewith. The clamping device 82 is used to mount a grinding disc 92. Thus, when the output shaft 84 is rotated, it can drive the clamping device 82 to rotate synchronously so as to drive the grinding disc 92 to do a circular rotation and grind a workpiece whereby the function of the angle grinder 100 may be realized. Specifically, the output shaft 84 is mounted on the front housing 11, which is disposed partially in the housing 10 and exposed partially out of the front housing 11. The output shaft 84 is extended along a direction of an output axis 101. The direction of the output axis 101 can be considered as the length direction of the output shaft 84. The clamping device 82 is mounted on the output shaft 84 and exposed out of the front housing 11, so that the user can disassemble the grinding disc 92 conveniently.

The guard 83 is mounted on the front housing 11, which is used to protect the user during operation of the angle grinder 100. When the grinding disc 92 is mounted on the clamping device 82, the guard 83 surrounds the grinding disc 92 partially. Thus, the guard 83 can prevent the debris from splashing to the user and prevent the grinding disc 92 from flying towards the user and hurting the user when the grinding disc 92 is broken unexpectedly.

The brushless motor 85 is mounted in the motor housing 121 of the handle housing 12. The brushless motor 85 is provided with or connected with a motor shaft 851. The transmission mechanism 20 is arranged between the brushless motor 85 and the output shaft 84. During operation, the power of the brushless motor 85 is transmitted to the transmission mechanism 20. The transmission mechanism 20 is used to transmit power between the motor shaft 851 and the output shaft 84 so as to drive the output shaft 84 to rotate about the output axis 101. Specifically, the motor shaft 851 of the brushless motor 85 is extended along a direction of a motor axis 102. The direction of the motor axis 102 can be considered as the length direction of the motor shaft 851.

Figure 5:
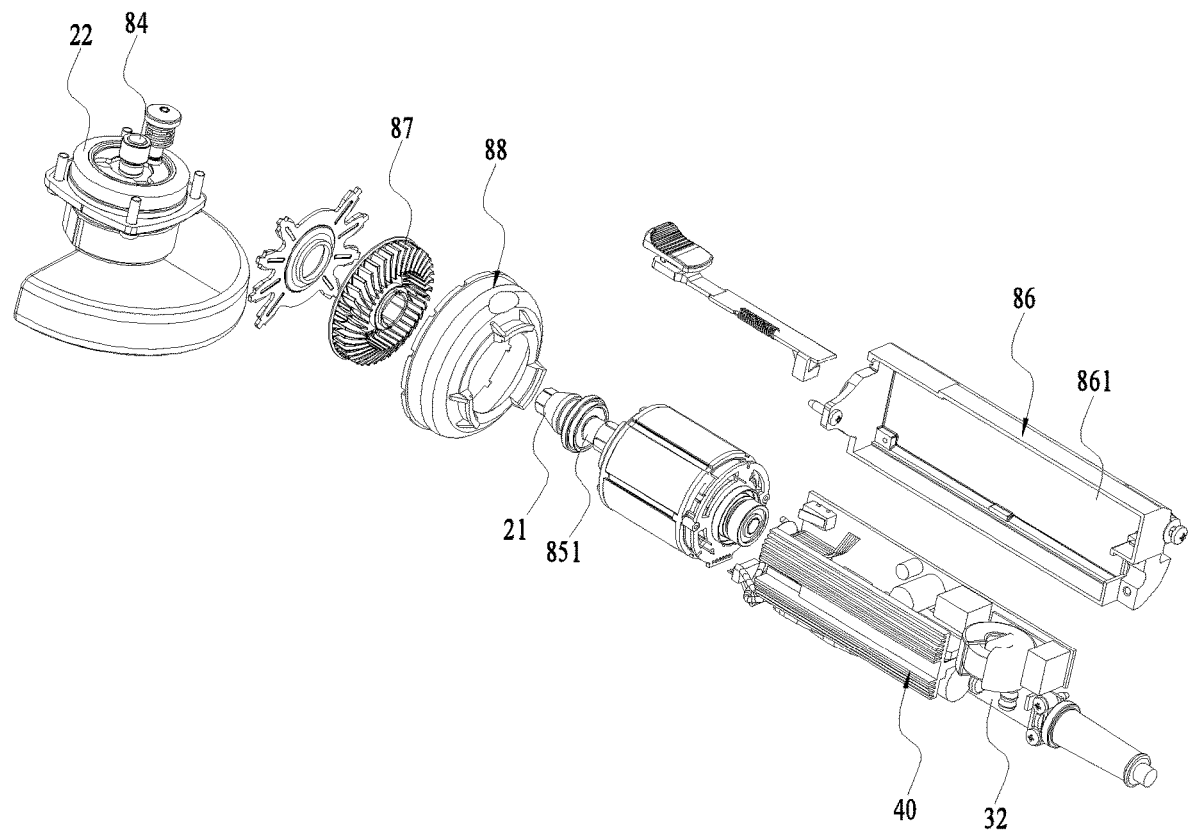
FIG. 5 is an exploded view of other parts which are separated from the housing in FIG. 4.
Figure 6:
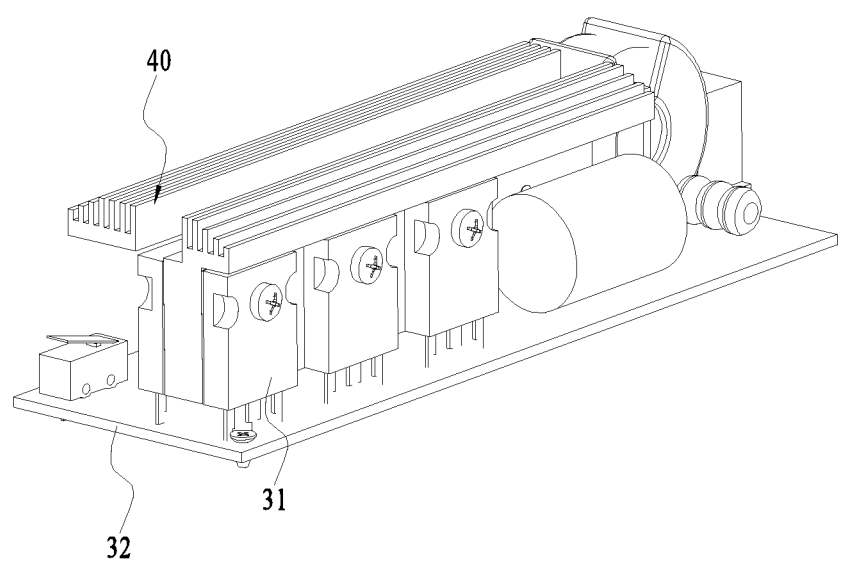
FIG. 6 is a schematic view of a circuit board assembly coupling with a cooling element in FIG. 3.

The motor shaft 851 is substantially perpendicular to the output shaft 84, and the motor axis 102 is substantially perpendicular to the output shaft 84. Referring to FIGS. 3-5, the transmission mechanism 20 includes a first bevel gear 21 and a second bevel gear 22. The first bevel gear 21 is mounted on the motor shaft 851 and can be rotated with the motor shaft 851 synchronously. The second bevel gear 22 is mounted on the output shaft 84 and can be rotated with the output shaft 84 synchronously. The second bevel gear 22 is engaged with the first bevel gear 21. Thus, when the motor shaft 851 is rotated, the first bevel gear 21 drives the second bevel gear 22 to rotate, and the second bevel gear 22 drives the output shaft 84 to rotate synchronously so as to realize the transmission between the motor shaft 851 and the output shaft 84.

For the brushless motor 85 and the handle portion 12a, a ratio between a rated power P of the brushless motor 85 and a size L1 of the handle portion 12a in a direction substantially perpendicular to a plane defined by the motor shaft 851 and the output shaft 84 is greater than or equal to 18 W/mm and less than or equal to 25 W/mm. Further, a ratio between the rated power P of the brushless motor 85 and a perimeter of the handle portion 12a in a direction surrounding the motor shaft 851 is greater than or equal to 3.5 W/mm and less than or equal to 7 W/mm. The perimeter of the handle portion 12a is the length of the handle portion 12a in the circumferential direction surrounding the motor axis 102. Thus, the angle grinder 100 satisfies certain rated power needs and the handle portion 12a has a reasonable size. The handle portion 12a not only can contain the brushless motor 85 therein, but also has a reasonable thickness. It is convenient for the user to grip, and the gripping feeling is improved. For the handle housing 12 and the handle portion 12a, a ratio of a size L2 of the handle portion 12a along the length direction of the motor shaft 851 and the size L1 of the handle portion 12a in the direction substantially perpendicular to the plane defined by the motor shaft 851 and the output shaft 84 is greater than or equal to 3.2 and less than or equal to 4.8. Thereby, the handle housing 12 has the reasonable length and the handle portion 12a has the reasonable thickness. It can prevent the handle housing 12 from being too long or too short and prevent the handle portion 12a from being too thin or too thick, so that the gripping feeling and the visual effect of the angle grinder 100 can be further improved.

The circuit board assembly 30 is used to transmit the electricity provided by the power supply 91 to the brushless motor 85. Referring to FIGS. 3-6, the circuit board assembly 30 includes a circuit element 31 and a circuit board 32. The circuit element 31 is used to control the brushless motor 85. The circuit board 32 is used to mount the circuit element 31. So, the circuit element 31 can be connected with the brushless motor 85 electrically. More specifically, the circuit element 31 can be a MOS transistor for controlling the brushless motor 85. There can be six MOS transistors disposed on the circuit board 32. The circuit board 32 is disposed within the housing 10. Further, the circuit board 32 is disposed within the handle housing 12. A ratio between a size L3 of the housing 10 along the length direction of the motor shaft 851 and a size L4 of the circuit board 32 along the length direction of the motor shaft 851 is greater than or equal to 1.4 and less than or equal to 2.2. Thereby, the circuit board 32 takes a reasonable space in the handle housing 12.

In a direction which is substantially parallel to the motor shaft 851, that is also in the direction of the motor axis 102, the brushless motor 85 is arranged between the transmission mechanism 20 and the circuit board assembly 30. So, the angle grinder 100 has simple and compact structure which can be assembled conveniently. And the angle grinder 100 has a small size which facilitates gripping by the user.

Referring to FIGS. 4-5, the angel grinder 100 further includes an enclosing capsule 86, a cooling element 40, a fan 87 and an air guiding cover 88 which are all disposed in the housing 10.

The enclosing capsule 86 is disposed within the handle housing 12 for fixing the circuit board assembly 30 in the housing 10. The circuit board 32 is disposed within the housing 10 and fastened on the enclosing capsule 86. The enclosing capsule 86 is formed with an opening 861 allowing the circuit element 31 to expose out of the enclosing capsule 86.

Figure 7:
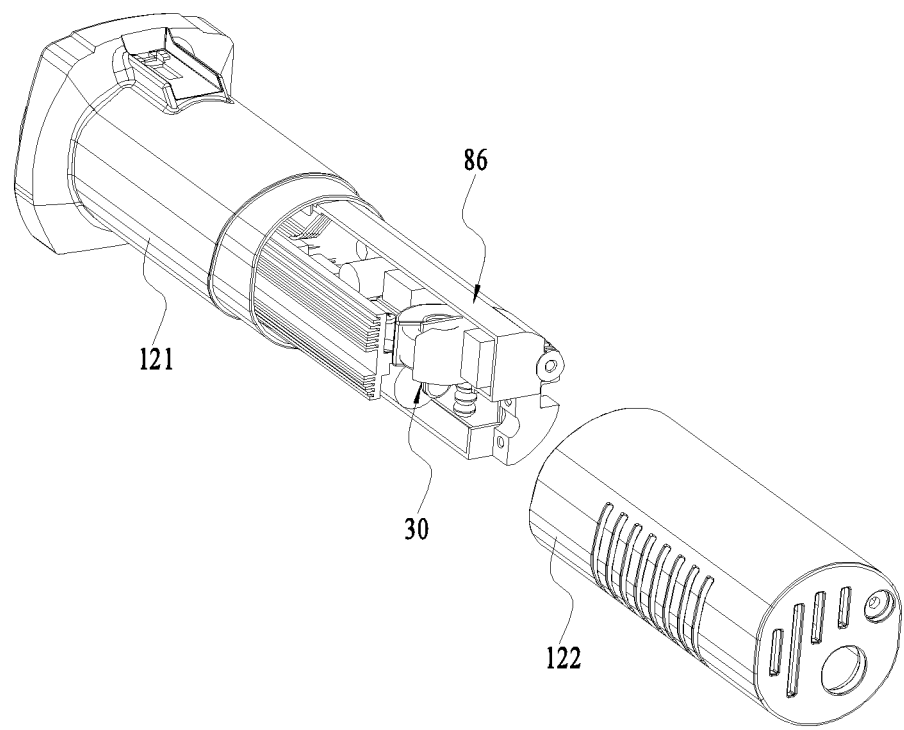
FIG. 7 is a schematic view of a handle housing, an enclosing capsule, the circuit board assembly, and the cooling element in FIG. 3.

Referring to FIGS. 7-10, during assembly, firstly, the circuit board assembly 30 is fastened in the enclosing capsule 86. In order to waterproof and insulate, the enclosing capsule 86 can be glue. Then, an entirety constituted by the enclosing capsule 86 and the circuit board assembly 30 is inserted in the motor housing 121, and the entirety and the motor housing 121 are connected fixedly through fasteners or other connecting structures. The entirety has one end disposed in the motor housing 121 and the other end exposed out of the motor housing 121, as shown in FIG. 7. And then the rear housing 122 is coupled with the motor housing 121 along the direction of the motor axis 102. The rear housing 122 and the motor housing 121 are coupled fixedly through fasteners or other connecting structures. At this moment, the entirety constituted by the enclosing capsule 86 and the circuit board assembly 30 is contained totally within the handle housing 12 constituted by the motor housing 121 and the rear housing 122. The motor housing 121, the enclosing capsule 86, the circuit board assembly 30, and the rear housing 122 constitute an entirety which can move together, and the assembly of which is accomplished.

It is convenient to assemble and disassemble the angle grinder 100 by mounting the circuit board assembly 30 fixedly to the enclosing capsule 86, and all the parts in the handle housing 12 are arranged reasonably and can be assembled easily.

Figure 8:
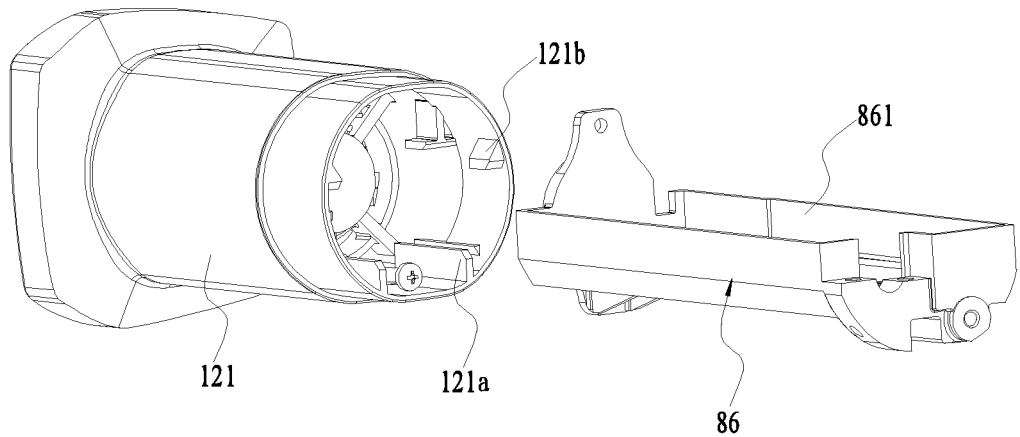
FIG. 8 is a schematic view of a motor housing and the enclosing capsule in FIG. 3.

As shown in FIG. 4, specifically, the motor housing 121 is used to contain the brushless motor 85. In the direction of the motor shaft 102, the motor housing 121 is arranged between the front housing 11 and the rear housing 122. When the enclosing capsule 86 is mounted to the motor housing 121, the brushless motor 85 is disposed on an end in the motor housing 121 which is departed from the enclosing capsule 64. As shown in FIG. 8, a supporting rib 121*a* and a limiting structure 121*b* are provided at the position where the motor housing 121 is mounted to the enclosing capsule 86. The supporting rib 121*a* is used to support the bottom of the enclosing capsule 86 which is departed from the opening 861. The limiting structure 121*b* is used to limit the position of the enclosing capsule 86 in the motor housing 121. During assembly, the enclosing capsule 86 is inserted into the motor housing 121 along the direction of the motor axis 102, the bottom of the enclosing capsule 86 which is departed from the opening 861 contacts with the supporting rib 121*a*, and an edge of the enclosing capsule 86 which is close to the opening 861 contacts with the limiting structure 121*b*. Thus, under the action of the supporting rib 121*a* and the limiting structure 121*b*, the enclosing capsule 86 can be disposed between the supporting rib 121*a* and the limiting structure 121*b* steadily in a direction substantially perpendicular to the motor axis 102.

Figure 9:
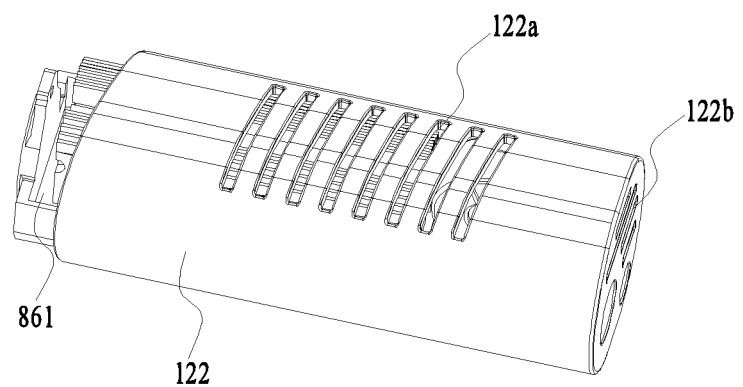
FIG. 9 is a schematic view of a rear housing coupling with the enclosing capsule in FIG. 3.
Figure 10:
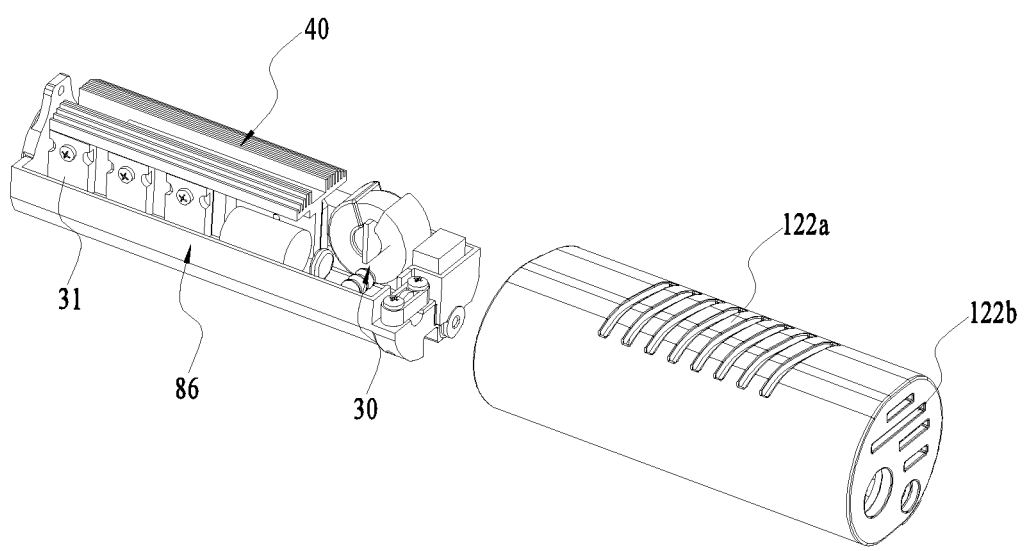
FIG. 10 is a schematic view of the rear housing separating from the enclosing capsule in FIG. 3.
Figure 11:
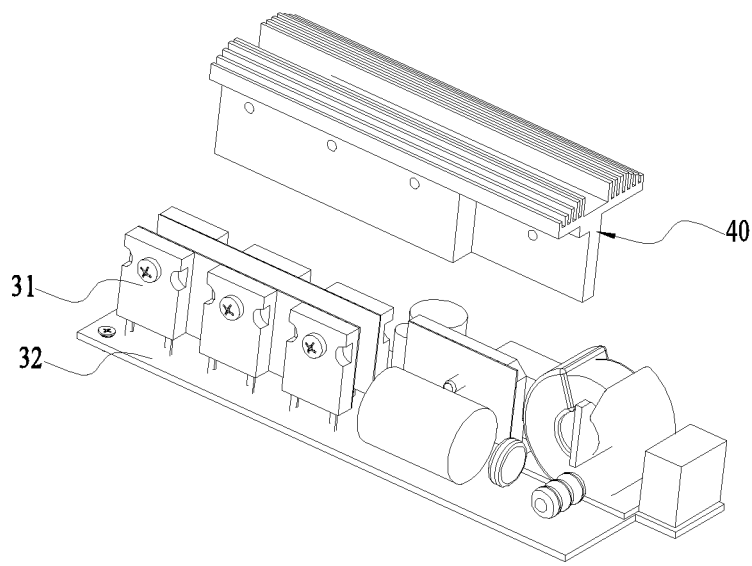
FIG. 11 is a schematic view of the circuit board assembly separating from the cooling element in FIG. 3.

Referring to FIGS. 9-10, the rear housing 122 is used to contain a part of the circuit board assembly 30. The rear housing 122 is provided with a side cooling window 122*a* and an end cooling window 122*b*. The side cooling window 122*a* is located on the rear housing 122 which is opposite to the opening 861 of the enclosing capsule 86. So, the circuit board assembly 30 in the enclosing capsule 86 faces the side cooling window 122*a* directly, which facilitates cooling of the circuit board assembly 30. The end cooling window 122*b* is located on an end of the rear housing 122 which is departed from the brushless motor 85 and the end cooling window 122*b* is opposite to the circuit element 31 which is exposed out of the enclosing capsule 86. This arrangement facilitates cooling of the circuit element 31 which is exposed out of the enclosing capsule 86.

Referring to FIGS. 4-5, the cooling element 40 is disposed within the handle housing 12 and mounted on the circuit board 32. The cooling element 40 and the circuit board assembly 30 constitute an entirety which can move together. And the circuit board assembly 30 is connected fixedly with the enclosing capsule 86, so the cooling element 40 is also disposed in the enclosing capsule 86. During assembly, the cooling element 40 is assembled together with the circuit board assembly 30 and the enclosing capsule 86. As we know, the circuit element 31 can generate heat when current passes therethrough. The cooling element 40 can dissipate the heat of the circuit element 31 by transmitting the heat to itself. So, the circuit element 31 can be cooled effectively and protected from damaging.

Referring to FIGS. 6 and 11-14, the cooling element 40 is connected fixedly with the circuit element 31, and the heat generated by the circuit element 31 can be transmitted to the cooling element 40 by connection. The cooling element 40 can contact with the circuit element 31 directly or a material can be arranged between the cooling element 40 and the circuit element 31 to make the cooling element 40 and the circuit element 31 contact tightly. For example, a silicone material or a washer can be arranged between the cooling element 40 and the circuit element 31.

As shown in FIG. 10, the cooling element 40 is disposed on an inner side of the side cooling window 122*a* and opposite to the side cooling window 122*a*, which facilitates transmission of the heat.

Specifically, the cooling element 40 includes a connection portion 41, a cooling portion 42, and fins 43 which can be integrated. The connection portion 41 is used to connect with the circuit element 31. The cooling portion 42 is arranged between the connection portion 41 and the housing 10. The fins 43 are disposed on the cooling portion 42.

Figure 12:
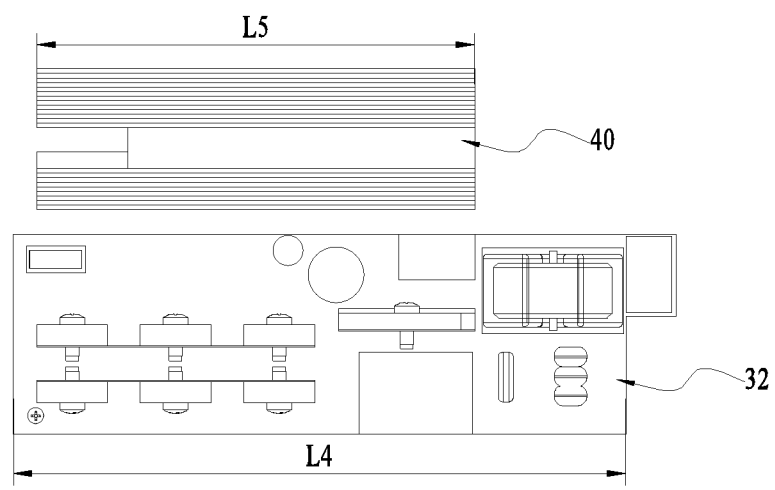
FIG. 12 is a plane view of the structure in FIG. 11.

As shown in FIG. 12, the cooling portion 42 has a projection in a plane that is substantially parallel to the circuit board 32 which is greater than the projection of the connection portion 41 in the plane so that the cooling element 40 has a larger cooling area which facilitates cooling of the circuit element 31 quickly.

As shown in FIG. 12, in order to make the cooling element 40 and the circuit board 32 have a reasonable size and prevent the cooling element 40 from being too long or too short relative to the circuit board 32 while having good cooling effect, a ratio between a size $L_4$ of the circuit board 32 along the length direction of the motor shaft 851 and a size $L_5$ of the cooling element 40 along the length direction of the motor shaft 851 is greater than or equal to 1.2 and less than or equal to 1.8. Further, a ratio between the size $L_4$ of the circuit board 32 along the length direction of the motor shaft 851 and a size of the cooling portion 42 along the length direction of the motor shaft 851 is greater than or equal to 1.2 and less than or equal to 1.8. A ratio between the size $L_4$ of the circuit board 32 along the length direction of the motor shaft 851 and a size of the fins 43 along the length direction of the motor shaft 851 is greater than or equal to 1.2 and less than or equal to 1.8. In the present example, the connection portion 41, the cooling portion 42 and the fins 43 have the same size along the length direction of the motor shaft 851 and the size relationship between the connection portion 41, the cooling portion 4, and the fins 43 and the circuit board 32 along the length direction of the motor shaft 851 can satisfy the ratios described above.

In a specific example, the connection portion 41 is connected with the circuit element 31 for transmitting heat to the cooling portion 42 and the fins 43. The connection portion 41 is extended along the direction of the motor axis 102. When the circuit board 32 is mounted in the handle housing 12, the circuit board 32 is also extended along the direction of the motor axis 102. The connection portion 41 is substantially perpendicular to the circuit board 32. The circuit board 32 can be provided with several circuit elements 31. The cooling element 40 can connect with at least more than two circuit elements 31. The circuit elements 31 connected with the connection portion 41 can be disposed on two sides of the connection portion 41 respectively. When the circuit elements 31 are MOS transistors as described above, the circuit board 32 are mounted with six MOS transistors. In order to reduce size, the six MOS transistors are mounted on two sides of the connection portion 41 respectively, so that the heat can be transmitted to the cooling element 40 uniformly, and the cooling effect is improved.

The cooling portion 42 is arranged between the connecting portion 41 and the housing 10, and also between the circuit elements 31 and the housing 10. The fins 43 are disposed on the cooling portion 42 and between the cooling portion 42 and the housing 10. Thus, the heat of the circuit elements 31 is transmitted to the connection portion 41, and a part of the heat of the connection portion 41 is dissipated through the cooling portion 42 and the other part of the heat is transmitted to the fins 43. Finally, the heat transmitted to the fins 43 is dissipated to the air through the fins 43.

Here, the cooling portion 42 has a first surface facing the inner wall of the housing 10 which is defined as an outer side 421 and a second surface facing the circuit element 31 which is defined as an inner side 422. The outer side 421 and the inner side 422 are substantially parallel to the circuit board 32 and perpendicular to the output shaft 84. The fins 43 protrude from the outer side 421 of the cooling portion 42 and are located between the outer side 421 of the cooling portion 42 and the inner wall of the housing 10.

Specifically, the cooling portion 42 includes two portions which are arranged on the same side of the connection portion 41 which is departed from the circuit board 32. The two portions are extended from the connection portion 41 to the two sides of the connection portion 41 on which the circuit elements 31 are mounted. For example, the cooling portion 42 and the connection portion 41 constitute a T shape. The connection portion 41 forms a vertical portion of the T shape, and the cooling portion 42 forms a horizontal portion of the T shape. The two portions of the cooling portion 42 form two side portions of the horizontal portion which are located on the two sides of the vertical portion.

Figure 13:
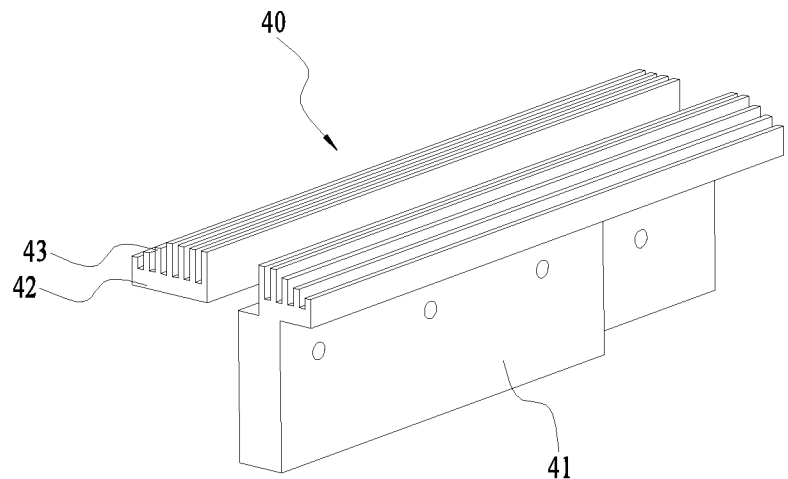
FIG. 13 is a schematic view of the cooling element in FIG. 11.
Figure 14:
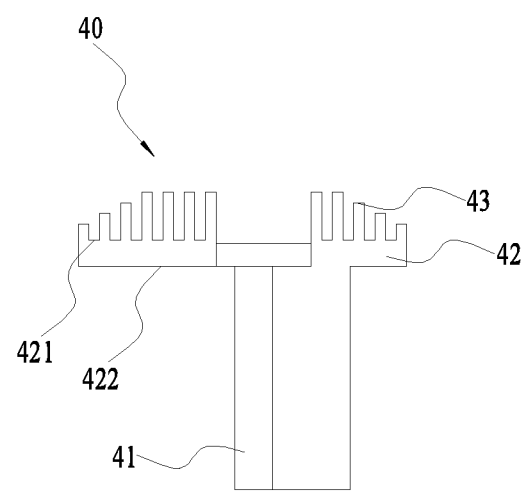
FIG. 14 is a side view of the cooling element in FIG. 11.

Referring to FIGS. 13-14, the number of the fins 43 is greater than or equal to 2. A part of the two more fins 43 is disposed on a portion of the cooling portion 42, and the other part of the two more fins 43 is disposed on the other portion of the cooling portion 42. The multiple fins 43 are substantially parallel to each other. A guiding channel is formed between two adjacent fins 43. Each fin protrudes out of the outer side 421 of the cooling portion 42 along a direction substantially perpendicular to the outer side 421 of the cooling portion 42. The outer side 421 is substantially parallel to the circuit board 32, so that the fins 43 are substantially perpendicular to the circuit board 32 and extended along the direction of the motor axis 102. Thus, the guiding channel formed between two adjacent fins 43 can guide the air to flow through the cooling element 40 along the direction substantially parallel to the motor axis 102 so as to take away the heat of the circuit elements 31.

In the present example, as described above, the cooling portion 42 and the connection portion 41 constitute the T shape. In order to match with the handle housing 12, the multiple fins 43 have different heights. Specifically, the fins 43 on the edge of the cooling portion 42 have a small height, and the fins 43 on the inner side of the cooling portion 42 have a larger height. That is, from the edge of the cooling portion 42 to close to the connection portion 41 and then to the edge again, the height of the multiple fins 43 becomes large from small and then become small from large again. Thus, for the fins 43, the multiple fins 43 have an end that is departed from the cooling portion 42 to form a circular arc, so that the fins 43 can match with the handle housing 12. A distance between the fins 43 and the handle housing 12 is uniform, which facilitates the cooling effect.

Referring to FIGS. 3 and 5, the fan 87 is driven by the motor shaft 851 to rotate. Specifically, the fan 87 is mounted on the motor shaft 851 and can rotate with the motor shaft 851 synchronously. When the fan 87 is rotated, an air flow can be formed which flows into the housing 10 from outside and then flows out of the housing 10 again.

In order to form an air flow, the housing 10 is formed with a cooling air inlet and a cooling air outlet which communicate the inside and outside of the housing 10. The cooling air inlet and the cooling air outlet can be disposed on two sides of the fan 87 respectively. The cooling air inlet is disposed on one side of the fan 87 which is close to the brushless motor 85, and the cooling air outlet is disposed on the other side of the fan 87 which is departed from the brushless motor 85. For the angle grinder 100 in the present example, the cooling air inlet can be one or all of the side cooling window 122a and the end cooling window 122b. The cooling air outlet can be a portion of the front housing 11 which communicates with the outside. More specifically, the cooling air outlet can be formed by the open portion of the front housing 11 facing the clamping device 82. Thus, when the fan 87 is rotated, an air flow can be formed which flows into the housing 10 from the cooling air inlet and flows out of the housing 10 from the cooling air outlet. The air flow can flow through the side cooling window 122a, the end cooling window 122b, the circuit board assembly 30, the cooling element 40 and the brushless motor 85, so that the circuit board assembly 30 and the motor can be cooled effectively.

The air flow flowing from the cooling air inlet to the cooling air outlet forms a path which corresponds to a cooling channel, and the cooling channel has an air flow value at every point. It can be defined that when the fan 87 is rotated, the cooling channel has a maximum air flow value. A ratio range between the rate power P of the brushless motor 85 and the maximum air flow value is greater than 43 $W(g/s)^{-1}$ and less than or equal to 500 $W(g/s)^{-1}$. Thus, when the fan 87 is rotated, the air flow has the maximum air flow value so as to improve the cooling effect of the angle grinder 100.

Figure 15:
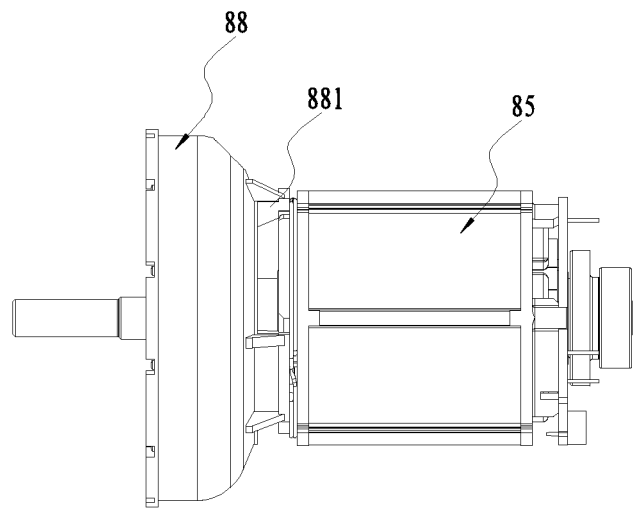
FIG. 15 is a plane view of an air guiding cover, a fan, and a brushless motor in FIG. 3.
Figure 16:
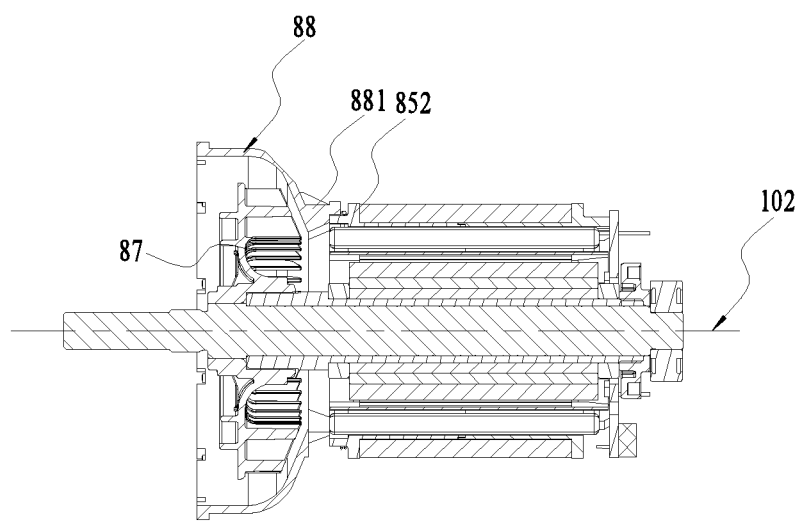
FIG. 16 is a section view of the structure in FIG. 15.
Figure 17:
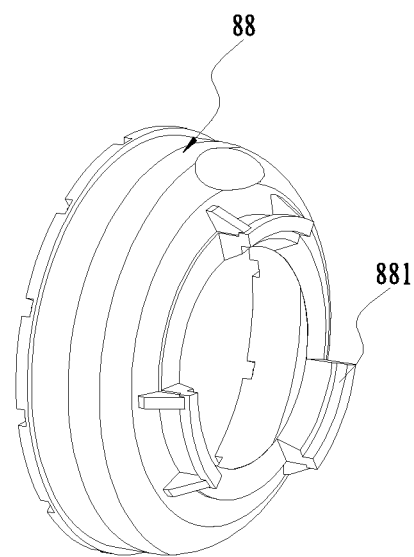
FIG. 17 is a schematic view of the air guiding cover in FIG. 15.

Referring to FIGS. 15-17, the air guiding cover 88 is used to guide the air generated by the fan 87 to flow towards the cooling air outlet. Specifically, the air guiding cover 88 and the fan 87 are arranged between the transmission mechanism 20 and the circuit board assembly 30, and the fan 87 is disposed in the air guiding cover 88. The air guiding cover 88 has two open ends along the direction of the motor axis 102. The motor shaft 851 goes through the air guiding cover 88 from its one side to the other side.

The air guiding cover 88 is provided with a positioning bulge 881 on its one side close to the brushless motor 85. The positioning bulge 881 is protruded towards the brushless motor 85 from a surface of the air guiding cover 88. When the air guiding cover 88 is mounted in the handle housing 12, the positioning bulge 881 contacts with the brushless motor 85. Further, the positioning bulge 881 can contact with a shell 852 of the brushless motor 85. There can be several positioning bulges 881. For example, in the present embodiment, the air guiding cover 88 are provided with four positioning bulges 881 on its side facing the brushless motor 85. The four positioning bulges 881 are arranged around the end of the air guiding cover 88 facing the brushless motor 85, so that the edge of the opening on the end of the air guiding cover 88 facing the brushless motor 85 are divided into four areas.

Figure 18:
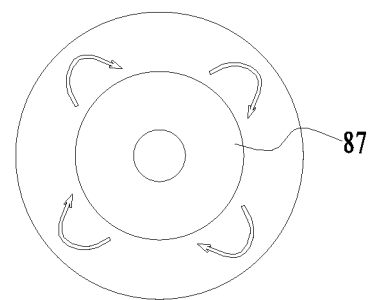
FIG. 18 is a schematic view of an air path wherein the fan is disposed in a currently known air guiding cover.
Figure 19:
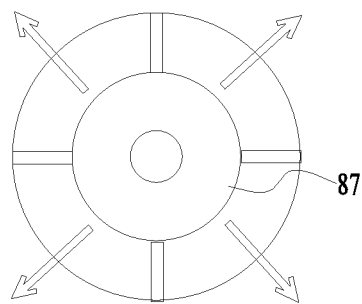
FIG. 19 is a schematic view of an air path wherein the fan is disposed in the air guiding cover in FIG. 17.

As shown in FIG. 18, as we know, a part of the air flow generated by the centrifugal fan 87 usually flows circularly along a tangential line around the centrifugal fan 87. So, the air around the fan 87 cannot flow away effectively, and the negative pressure around the fan 87 is small so that the air flow with larger air flow value cannot be generated in the housing 10. As shown in FIG. 19, in the present embodiment, the annular space around the fan 87 is divided into four areas by the positioning bulges 881 contacting with the brushless motor 85. The four positioning bulges 881 on the edge of four areas can block and brake the air flow flowing annularly. The air flow blocked may flow radially so as to improve the pressure around the fan 87 and increase the air flow value. Thus, the cooling effect is further improved.

The arrangement of all the parts inside the angle grinder 100, the side cooling window 122a and the end cooling window 122b formed on the housing 10, the arrangement of the cooling element 40, the position of the fan 87 and the structure of the air guiding cover 88 contribute to cool the angle grinder 100, and a part or all of them has a function of increasing the maximum air flow value in the housing 10.

Figure 20:
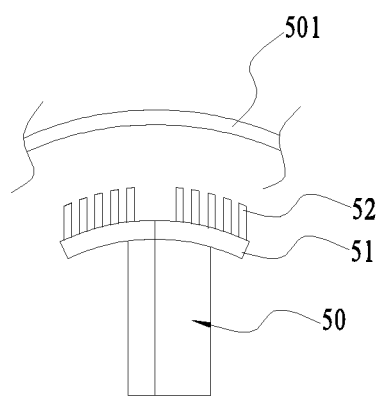
FIG. 20 is a side view of a further example cooling element.

As shown in FIG. 20, in a second example, the cooling element 50 is not limited to the T shape. For example, in the present example, the cooling portion 51 has an arc shape approximately. The arc shape can match with the outline of the housing 501. So, the several fins 52 protruding from the cooling portion 51 have the same height. And the distance between the fins 52 and the inner wall of the housing 501 can be kept consistent, so that the cooling effect can be improved.

Figure 21:
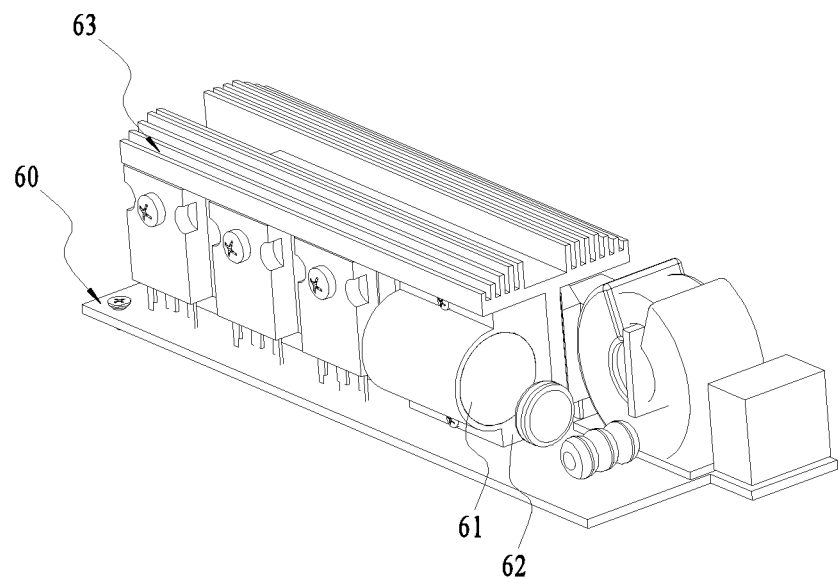
FIG. 21 is a side view of an example circuit board assembly wherein a cooling material is integrated.
Figure 22:
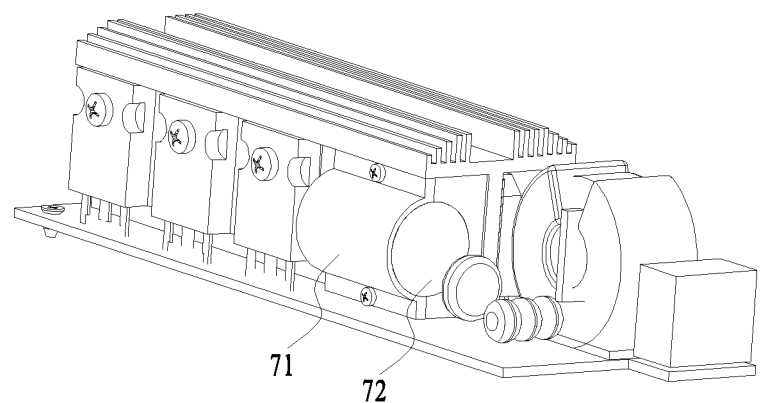
FIG. 22 is a side view of an example circuit board assembly wherein the cooling material is formed by two parts.

As shown in FIG. 21, in a third example, the circuit board assembly 60 further includes a capacitance 61 acting as the circuit element. In order to cool the capacitance 61, a cooling material 62 is surrounded the capacitance 61 so as to form a hollow cylinder. The capacitance 61 is contained within the hollow cylinder. The cooling material 62 and the cooling element 63 are connected fixedly. As shown in FIG. 22, in another example, a cooling material 71 is formed by two parts which are abutting, which also can form the hollow cylinder for containing a capacitance 72.

The above illustrates and describes basic principles, main features and advantages of the subject device. Those skilled in the art should appreciate that the above described examples do not limit the invention hereinafter claimed in any form. Rather, technical solutions obtained by equivalent substitution or equivalent variations are all intended to fall within the scope of the invention claimed.

What is claimed is:

1. An angle grinder, comprising:
a housing formed with a handle;
a clamping device for mounting a grinding disk;
an output shaft for driving the clamping device to rotate;
a brushless motor provided with a motor shaft, the motor shaft extending along a first axis;
a transmission mechanism for transmitting power between the motor shaft and the output shaft;
a circuit board assembly for providing electricity to the brushless motor;
an enclosing capsule for mounting the circuit board assembly in the housing;
a power supply cable electrically coupled to the circuit board assembly; and
a cooling element disposed within the housing,
wherein the clamping device is disposed outside of the housing and connected with the output shaft, the output shaft is at least partially disposed inside of the housing and connected with the transmission mechanism, the brushless motor is arranged between the transmission mechanism and the circuit board assembly in a direction substantially parallel to the motor shaft, and the motor shaft is disposed along a direction substantially perpendicular to the output shaft,
wherein the housing comprises a rear housing, a front housing, and a motor housing, at least a portion of the motor housing is disposed between the rear housing and the front housing, the rear housing is formed with a hole through which the cable passes, the front housing is used to mount the output shaft, the motor housing is used to house the brushless motor, the motor housing is an integrally formed body, the motor housing comprises a first portion having an outer surface with an operating switch mounted to thereto and a second portion for guiding the rear housing to be coupled to the motor housing along the first axis, and the second portion is inserted into the interior of the rear housing when the rear housing is coupled the motor housing,
wherein the circuit board assembly comprises a circuit element which generates heat when a current passes therethrough and a circuit board for mounting the circuit element, the circuit board extends in a first plane, the cooling element comprises a first extending surface extending in a second plane perpendicular to the first plane and a second extending surface extending in a third plane parallel to the first plane, the circuit element includes a contact surface attached to the first extending surface, the cooling element further comprises fins protruding from the second extending surface, the fins extending towards the inner surface of the housing along a direction substantially perpendicular to the first plane, the number of fins is greater than or equal to two and adjacent fins are substantially parallel to each other, and at least two of the fins have different heights in a direction perpendicular to the first plane, wherein the fins on the edge of the cooling element have a relatively smaller height and the fins on the inner side of the cooling element have a relatively larger height;
and
wherein the enclosing capsule is disposed in the housing, the circuit element is electrically coupled with the brushless motor, the circuit board is mounted within the enclosing capsule, the enclosing capsule is formed with an opening allowing the circuit element to be exposed therethrough, the motor housing is provided with a supporting rib for supporting the bottom of the enclosing capsule and a limiting structure for limiting a position of the enclosing capsule, the limiting structure connects an edge of the enclosing capsule which is close to the opening to guide the enclosing capsule to insert into the motor housing along the direction of the motor axis.

2. The angle grinder of claim 1, wherein the rear housing is formed with a side cooling window disposed opposite to the opening of the box enclosing capsule.

3. The angle grinder of claim 2, wherein the cooling element is disposed inside of the side cooling window.

4. The angle grinder of claim 3, further comprising a fan driven by the motor shaft to rotate wherein the fan is arranged between the transmission mechanism and the circuit board assembly and the fan generates an air flow that passes the side cooling window and the cooling element.

5. The angle grinder of claim 2, wherein the rear housing is formed with an end cooling window on an end thereof which is departed from the brushless motor, and the end cooling window is disposed opposite to the circuit element exposed out of the opening of the enclosing capsule.

6. The angle grinder of claim 2, further comprising a fan driven by the motor shaft to rotate and an air guiding cover for guiding an air flow generated by the fan wherein the air guiding cover is arranged between the transmission mechanism and the circuit board assembly, the motor shaft goes through the air guiding cover, and the fan is contained in the air guiding cover.

7. The angle grinder of claim 6, wherein the air guiding cover is provided with a positioning bulge on its side close to the brushless motor and the positioning bulge protrudes towards the brushless motor and contacts with the brushless motor.

8. The angle grinder of claim 1, wherein a ratio between a length (L3) of the housing along a longitudinal direction of the motor shaft and a length (L4) of the circuit board along the longitudinal direction of the motor shaft is greater than or equal to 1.8 and less than or equal to 3.

9. The angle grinder of claim 1, wherein the housing comprises a handle portion for a user to grip and a ratio between a rated power of the brushless motor and a length (L1) of the handle portion in a direction substantially perpendicular to a plane defined by the motor shaft and the output shaft is greater than or equal to 18 W/mm and less than or equal to 25 W/mm.

10. The angle grinder of claim 1, wherein the housing comprises a handle portion for a user to grip and a ratio between the rated power of the brushless motor and a perimeter of the handle portion in a direction surrounding the motor shaft is greater than or equal to 3.5 W/mm and less than or equal to 7 W/mm.

11. The angle grinder of claim 1, wherein the housing comprises a handle housing for forming the handle portion wherein a ratio between a length (L2) of the handle portion along a length direction of the motor shaft and a length (L1) of the handle portion in a direction which is substantially perpendicular to a plane defined by the motor shaft and the output shaft is greater than or equal to 3.2 and less than or equal to 4.8.

12. The angle grinder of claim 1, wherein the circuit element is thermally connected with the cooling element so that heat generated by the circuit element can be transmitted to the cooling element, and a ratio between a length (L4) of the circuit board along a length direction of the motor shaft and a length (L5) of the cooling element along the longitudinal direction of the motor shaft is greater than or equal to 1.2 and less than or equal to 1.8.

13. The angle grinder of claim 1, further comprising a fan driven by the motor shaft to rotate, wherein the housing is formed with a cooling air inlet communicating inside and outside of the housing and a cooling air outlet communicating inside and outside of the housing whereby, when the fan is rotated, an air flow can be generated which flows into the housing from the cooling air inlet and flows out of the housing from the cooling air outlet, the air flow in the housing has a maximum air flow value, and a ratio range between a rated power of the brushless motor and the maximum air flow value is greater than 43 $W(g/s)^{-1}$ and less than or equal to 500 $W(g/s)^{-1}$.

* * * * *